United States Patent
Kim

(10) Patent No.: US 11,842,647 B2
(45) Date of Patent: Dec. 12, 2023

(54) UNMANNED MOVING VEHICLE FOR MONITORING AND SYSTEM INCLUDING SAME

(71) Applicant: PABLO AIR Co., Ltd., Incheon (KR)

(72) Inventor: Hyeong Min Kim, Incheon (KR)

(73) Assignee: PABLO AIR Co., Ltd., Incheon (KR)

( * ) Notice: Subject to any disclaimer, the term of this patent is extended or adjusted under 35 U.S.C. 154(b) by 274 days.

(21) Appl. No.: 17/110,830

(22) Filed: Dec. 3, 2020

(65) Prior Publication Data

US 2021/0327289 A1    Oct. 21, 2021

(30) Foreign Application Priority Data

Apr. 17, 2020    (KR) .......................... 10-2020-0046930

(51) Int. Cl.
   *G05D 1/10*    (2006.01)
   *G05D 1/12*    (2006.01)
   (Continued)

(52) U.S. Cl.
   CPC ......... *G08G 5/0043* (2013.01); *B64C 39/024* (2013.01); *G05D 1/104* (2013.01);
   (Continued)

(58) Field of Classification Search
   CPC ............ B64C 39/024; B64C 2201/127; B64C 2201/143; G08G 5/0043; G08G 5/008; G08G 5/0013; G05D 1/12; G05D 1/104
   See application file for complete search history.

(56) References Cited

U.S. PATENT DOCUMENTS 5,521,817 A * 5/1996 Burdoin ............... G05D 1/0027
701/3
9,985,718 B2 * 5/2018 Frolov ................... G05D 1/104
(Continued)

FOREIGN PATENT DOCUMENTS

CN       106802665 A     6/2017
CN       107817814 A     3/2018
(Continued)

OTHER PUBLICATIONS

Mousavian, Arsalan and Anguelov, Dragomir and Flynn, John and Kosecka, Jana, "3D Bounding Box Estimation Using Deep Learning and Geometry", 2016, Arxiv. (Year: 2016).*
(Continued)

*Primary Examiner* — Marc Burgess
*Assistant Examiner* — Karen Lynelle Furgason
(74) *Attorney, Agent, or Firm* — NKL Law; Jae Youn Kim

(57) ABSTRACT

Provided is an unmanned moving vehicle for monitoring and a system including the same and, more particularly, to a method of controlling an unmanned moving vehicle whose communication with a master unmanned device is disconnected. To this end, the unmanned moving vehicle system for monitoring includes a master unmanned device performing communication with a ground control system located on the ground; and an unmanned moving vehicle performing communication with the master unmanned device, flying in formation around the master unmanned device, and calculating a distance to other unmanned moving vehicle flying in formation when communication with the master unmanned device is disconnected.

9 Claims, 4 Drawing Sheets

(51) Int. Cl.
*G08G 5/00* (2006.01)
*B64C 39/02* (2023.01)
*B64U 101/30* (2023.01)

(52) U.S. Cl.
CPC ............. *G05D 1/12* (2013.01); *G08G 5/0008* (2013.01); *G08G 5/0013* (2013.01); *B64U 2101/30* (2023.01); *B64U 2201/102* (2023.01)

(56) References Cited

U.S. PATENT DOCUMENTS

| | | | | |
|---|---|---|---|---|
| 10,692,043 B1* | 6/2020 | Woodyard | ............. | G07F 17/40 |
| 2005/0165516 A1* | 7/2005 | Haissig | ................ | G08G 5/0008 |
| | | | | 244/175 |
| 2010/0070145 A1* | 3/2010 | Foster | ................. | G05D 1/0278 |
| | | | | 701/50 |
| 2014/0226858 A1* | 8/2014 | Kang | .............. | H04N 5/232933 |
| | | | | 382/103 |
| 2014/0249693 A1 | 9/2014 | Stark et al. | | |
| 2014/0251287 A1* | 9/2014 | Takezoe | ................. | F02D 41/18 |
| | | | | 123/568.11 |
| 2016/0155339 A1 | 6/2016 | Saad et al. | | |
| 2016/0180531 A1* | 6/2016 | Lessmann | ............... | G06T 7/246 |
| | | | | 382/103 |
| 2016/0368600 A1* | 12/2016 | Frolov | ................ | B64C 29/0025 |
| 2018/0150087 A1* | 5/2018 | Enos | ....................... | G06Q 10/00 |
| 2018/0209764 A1* | 7/2018 | Ginsberg | ................ | F41G 7/226 |
| 2019/0071026 A1* | 3/2019 | Terashima | ........... | G10K 11/175 |
| 2019/0174149 A1* | 6/2019 | Zhang | ................ | H04N 21/2393 |
| 2019/0271991 A1* | 9/2019 | Dulmage | ................. | G08G 1/22 |
| 2019/0377947 A1* | 12/2019 | Olsson | .................... | G06V 20/00 |
| 2020/0133305 A1* | 4/2020 | Gariepy | ................. | B60L 58/12 |
| 2021/0004976 A1* | 1/2021 | Guizilini | .................. | G06N 5/04 |
| 2022/0285836 A1* | 9/2022 | Badichi | .................... | H01Q 3/02 |

FOREIGN PATENT DOCUMENTS

| | | |
|---|---|---|
| KR | 10-1881396 B1 | 7/2018 |
| KR | 10-1895343 B1 | 9/2018 |
| WO | 2015/051436 A1 | 4/2015 |

OTHER PUBLICATIONS

O'Shea, et al., "Introduction to Convolutional Neural Networks", arXiv, 2015 (Year: 2015).*

* cited by examiner

UNMANNED MOVING VEHICLE FOR MONITORING AND SYSTEM INCLUDING SAME

CROSS REFERENCE TO RELATED APPLICATION

The present application claims priority to Korean Patent Application No. 10-2020-0046930 filed Apr. 17, 2020, the entire contents of which is incorporated herein for all purposes by this reference.

BACKGROUND OF THE INVENTION

Field of the Invention

The present invention relates to an unmanned moving vehicle for monitoring and a system including the same and, more particularly, to a method of controlling an unmanned moving vehicle whose communication with a master unmanned device is disconnected.

Description of the Related Art

As interest in unmanned moving vehicles increases, the importance of developing related systems has been highlighted, and many studies on a single unmanned system have been conducted. Since the unmanned moving vehicles can advantageously reduce human injury compared to manned vehicles and perform various tasks such as searching, reconnaissance, and mapping of dangerous areas, studies on using the unmanned moving vehicles in related fields has been actively progressing. The unmanned vehicles are used for searching, reconnaissance, etc., in the military field, a delivery service using drones is being developed in the transportation field by businesses such as Amazon, Google, Alibaba, etc., and uses are being developed in various industrial fields. In addition, the unmanned moving vehicles are actively used in fields of firefighting, photography, agriculture, etc. and used in fields of submarine topography, mapping, and coastal reconnaissance as unmanned floating boats, unmanned submarines, etc.

According to the five-year plan for unmanned vehicle development, the global market is expected to grow at an annual average of 22% (24.8 billion dollars in 2015→67.3 billion dollars in 2020) in terms of market trends. Not only companies with existing unmanned vehicle technology in advanced countries such as the United States and EU, but also IT companies such as Google and Chinese companies are actively investing in technology development and making results. In Korea, the investment is focused on the development of medium and large UAVs, but the investment on the development of small UAVs is inadequate, whereby the technology for core parts of autonomous vehicles is inferior to advanced countries.

Currently, the unmanned moving vehicles are being used in various fields, and in particular, are used for monitoring marine or terrestrial environments.

SUMMARY OF THE INVENTION

Accordingly, the present invention has been made keeping in mind the above problems occurring in the related art, and an objective of the present invention is to provide an unmanned moving vehicle system for monitoring the ocean or land while flying in formation.

Another objective of the present invention is to provide a method by which unmanned moving vehicles are capable of continuing monitoring when communication is disconnected between a master unmanned device and the unmanned moving vehicles that are in formation.

Another objective of the present invention is to provide a method by which unmanned moving vehicles return to a predetermined point when communication is disconnected between a master unmanned device and the unmanned moving vehicles that are in formation.

Another objective of the present invention is to provide a method of calculating the distances of the unmanned moving vehicle to other unmanned moving vehicles.

In order to achieve the objective, an unmanned moving vehicle system for monitoring is provided according to the present invention, the system including a master unmanned device performing communication with a ground control system located on the ground; and an unmanned moving vehicle performing communication with the master unmanned device, flying in formation around the master unmanned device, and calculating a distance to other unmanned moving vehicle flying in formation when communication with the master unmanned device is disconnected.

The effects according to the present invention are generated as follows.

The unmanned moving vehicle for monitoring according to the present invention can monitor the environment while flying in formation, thereby increasing the scope of use, and reduce the cost by using the camera used for the existing mission without adding a separate sensor for collision avoidance.

In addition, according to the present invention, when communication with the master unmanned device is disconnected, the distance to the approaching unmanned moving vehicle can be calculated and the altitude of the unmanned moving vehicle can be changed when the calculated distance is within the predetermined distance, whereby there is an effect that can avoid collision with other unmanned moving vehicles.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

The foregoing and additional aspects of the present invention will become more apparent through preferred embodiments described with reference to the accompanying drawings. Hereinafter, it will be described in detail so that those skilled in the art can easily understand and reproduce the present invention through the embodiments.

Figure 1:
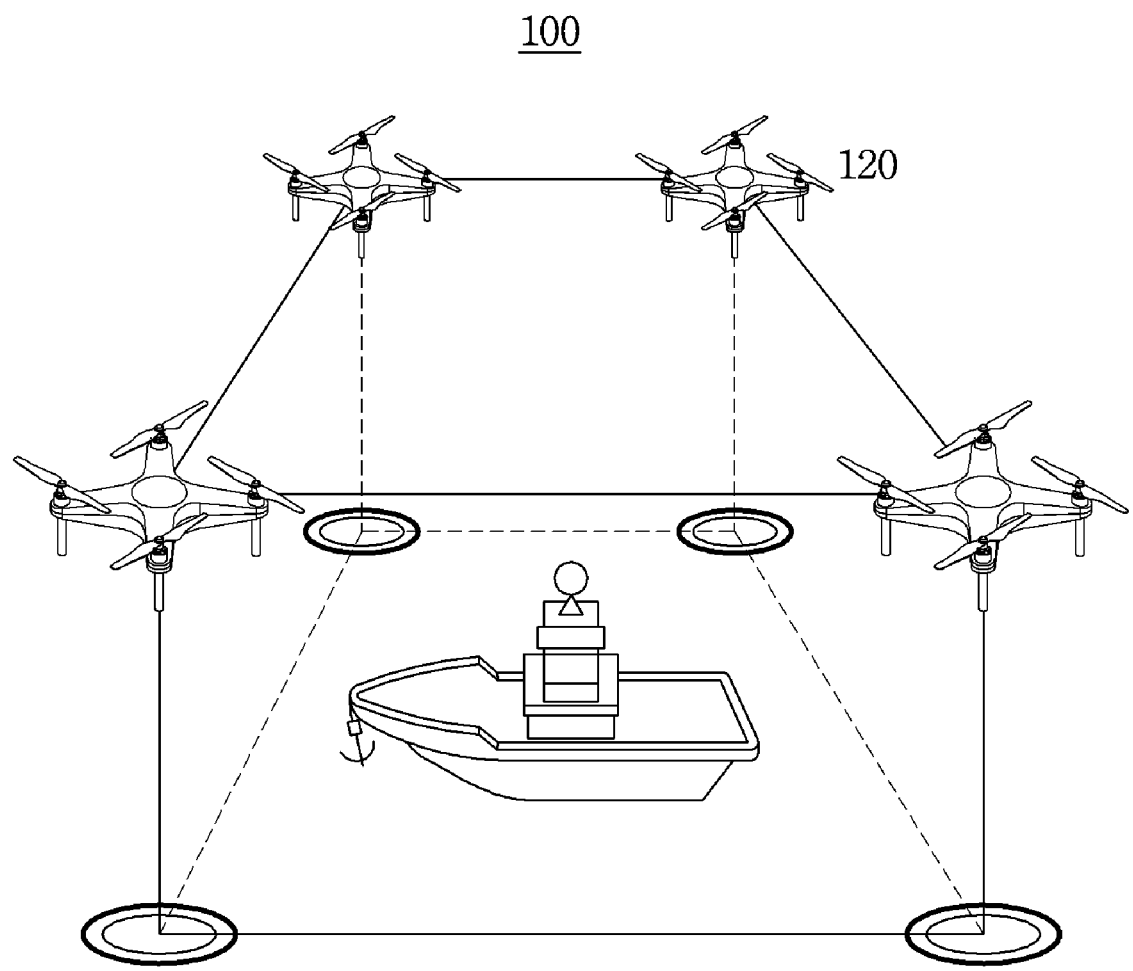
FIG. 1 is a view illustrating an unmanned moving vehicle system for monitoring surroundings according to an embodiment of the present invention.

FIG. 1 is a view illustrating an unmanned moving vehicle system for monitoring surroundings according to an embodiment of the present invention. Hereinafter, an unmanned moving vehicle system for monitoring an environment according to an embodiment of the present invention will be described in detail with reference to FIG. 1.

Referring to FIG. 1, the unmanned moving vehicle system 100 includes a master unmanned device 110 and multiple unmanned moving vehicles 120. In addition, the unmanned moving vehicle system 100 includes a ground control system.

The master unmanned device 110 performs communication with the ground control system, and transmits and receives information necessary for environmental monitoring. The master unmanned device 110 performs communication with multiple unmanned moving vehicles 120 and performs control so that the unmanned moving vehicles perform environmental monitoring while flying in a predetermined area.

In connection with the present invention, the master unmanned device 110 performs control so that the unmanned moving vehicles 120 maintain the same altitude while flying in formation.

The unmanned moving vehicles 120 maintain a certain distance interval on the basis of the master unmanned device 110. Each unmanned moving vehicle 120 has a safety radius in order to avoid collision with other unmanned moving vehicles flying in formation. When an obstacle or another unmanned moving vehicle approaches within a certain distance on the basis of the unmanned moving vehicle, the safety radius means the distance required to avoid collision with the unmanned moving vehicle. Thus, the unmanned moving vehicle 120 moves to an altitude that is set to avoid collision when another unmanned moving vehicle approaches within the safe radius.

The present invention is shown that monitors the surrounding environment using four unmanned moving vehicles, but is not limited thereto.

The unmanned moving vehicle 120 is equipped with a camera to identify specific issues using image information captured from the camera. For example, it is possible to obtain an image of an illegal fishing boat from the captured image information. According to the present invention, the unmanned moving vehicle 120 performs communication with the master unmanned device 110 and, if necessary, performs communication with other unmanned moving vehicles.

According to present invention, the unmanned moving vehicles 120 monitor the surrounding environment through collaboration. In this regard, specific details will be described below.

1. The unmanned moving vehicles receive a command to switch to a mission mode from the master unmanned device.
2. The unmanned moving vehicles start monitoring while flying in formation around the master unmanned device.
3. When the unmanned moving vehicles detect a suspect object during monitoring, the unmanned moving vehicles turn around and monitor the corresponding object.
4. A size of the monitored object (for example, illegal fishing boat) is identified, so that it is determined whether a help request signal is generated by other unmanned moving vehicles.
5. When the unmanned moving vehicle receiving the help request signal are currently on a mission, the unmanned moving vehicle first performs the current mission and then proceeds with collaboration with other unmanned moving vehicles.
6. The unmanned moving vehicle returns to formation on the basis of the master unmanned device after finishing the mission.

Multiple unmanned moving vehicles communicate via Wi-Fi, and each unmanned moving vehicle includes a separate telemetry for the purpose of emergency return in the case of emergency. Since the unmanned moving vehicles has a possibility of being shot down or falling during a mission, economic feasibility should also be considered. Therefore, according to the present invention, minimum mission equipment is mounted in the unmanned moving vehicles, and for example, a camera is used when performing the mission. In a normal case, the camera is used for monitoring illegal fishing boats. In the case of communication disconnection with the master unmanned device, the unmanned moving vehicles may collide and fall due to confusion with each other. Herein, it is possible to measure the distance between the unmanned moving vehicles through machine learning using the camera without a need for additional sensors such as Lidar.

Hereinafter, a machine learning method using a camera according to the present invention will be described.

The distance between an unmanned moving vehicle and other unmanned moving vehicle is measured by perform learning using a vector such as v=[1/Bh 1/Bw 1/Bd Ch Cw Cb]. Herein, Bh, Bw, and Bd indicate a height, width, and diagonal in the bounding box, respectively; and Ch, Cw, and Cb indicate average height, average width, and average length, respectively. The average height, average width, and average length mean average values for the object. For example, the unmanned moving vehicle stores average values for various objects, and in particular, the average height, average width, and average length for the objects. The unmanned moving vehicles use the stored average values to identify what the object is.

In addition, the present invention is configured to estimate the exact distance to the object by performing learning to reduce an error through v=[1/Bh 1/Bw 1/Bd Ch Cw Cb, Eh, Ew, Eb r], in which Eh, Ew, and Eb indicate a height error, width error, and length error, respectively, which represent the difference between the estimated value and the actual distance, and r indicates a compensation value for the error.

The actual distance is a value measured by a sensor such as a Lidar, etc. The actual distance of the object is input together with a photograph of the object, so that the unmanned moving vehicle repeatedly performs learning on the received actual distance and photograph.

The estimated value means the distance to the object determined from the image of the object captured through the camera after the learning is completed. The error means a difference between the actual distance and the estimated value. In addition, since the estimated value and the actual distance have three factors of height, width, and length, the compensation value for the error is set each for three factors.

Herein, r is 1 when the error is within 10 cm, and r is −1 when the error exceeds 10 cm, whereby learning is performed to have a higher value as r accumulates. The reason for setting the standard to 10 cm is because an error within a minimum of several centimeters is desirable when performing estimation with a camera in order to avoid collision between the unmanned moving vehicles. Therefore, the standard is set to 10 cm, and r is set to a positive value of 1 when the error is estimated to be within 10 cm and to a negative value of −1 when the error exceeds 10 cm, with respect to the estimated value after initial learning to represent the error. Accordingly, it is determined whether the distance is properly estimated. Herein, as r is accumulated, the learning is performed so that the accumulated value increases to a positive value.

To further explain, the present invention uses v=[1/Bh 1/Bw 1/Bd Ch Cw Cb]. When determining the object in the image, a bounding box is put around the detected object. Herein, Bh, Bw, and Bd indicate the height, width, and diagonal length of the bounding box, respectively. Ch, Cw, and Cb indicate average height, average width, and average length, as described above, and are used when determining what the corresponding detected object is. For example, it is assumed that when the detected object is a human, Ch=175 cm, width=55 cm, and length=30 cm, and when the object is a car, Ch=160 cm, Cw=180 cm, and Cb=400 cm. When performing learning, learning on distance estimation is performed through the corresponding vector and the actual distance (value). Herein, it is difficult to determine whether the distance is accurately estimated with only the corresponding vector because there is no feedback.

Therefore, according to the present invention, ten factors are used such as in [1/Bh 1/Bw 1/Bd Ch Cw Cb, Eh, Ew, Eb r], in which the error values between the actual values and the estimated values and the compensation values for the error values are used. Accordingly, it is possible to accurately determine the distance by performing double learning, in such a manner as to compensate the error value for the estimated value and feedback the same.

Considering the above vector as an input layer, the learning is performed through hidden layers. Through such a configuration, the unmanned moving vehicle measures the distance to an object and creates a route that is capable of avoiding collision, whereby the unmanned moving vehicle may avoid collision and return to the home safely. The input layer and hidden layers are used for learning. The input layer means an input value, and in the present invention, means a vector. The learning is performed through the hidden layers, the photograph is determined through the corresponding layer, and the learning is performed to estimate the distance. As the number of layers increases, the intensity of learning increases.

Figure 2:
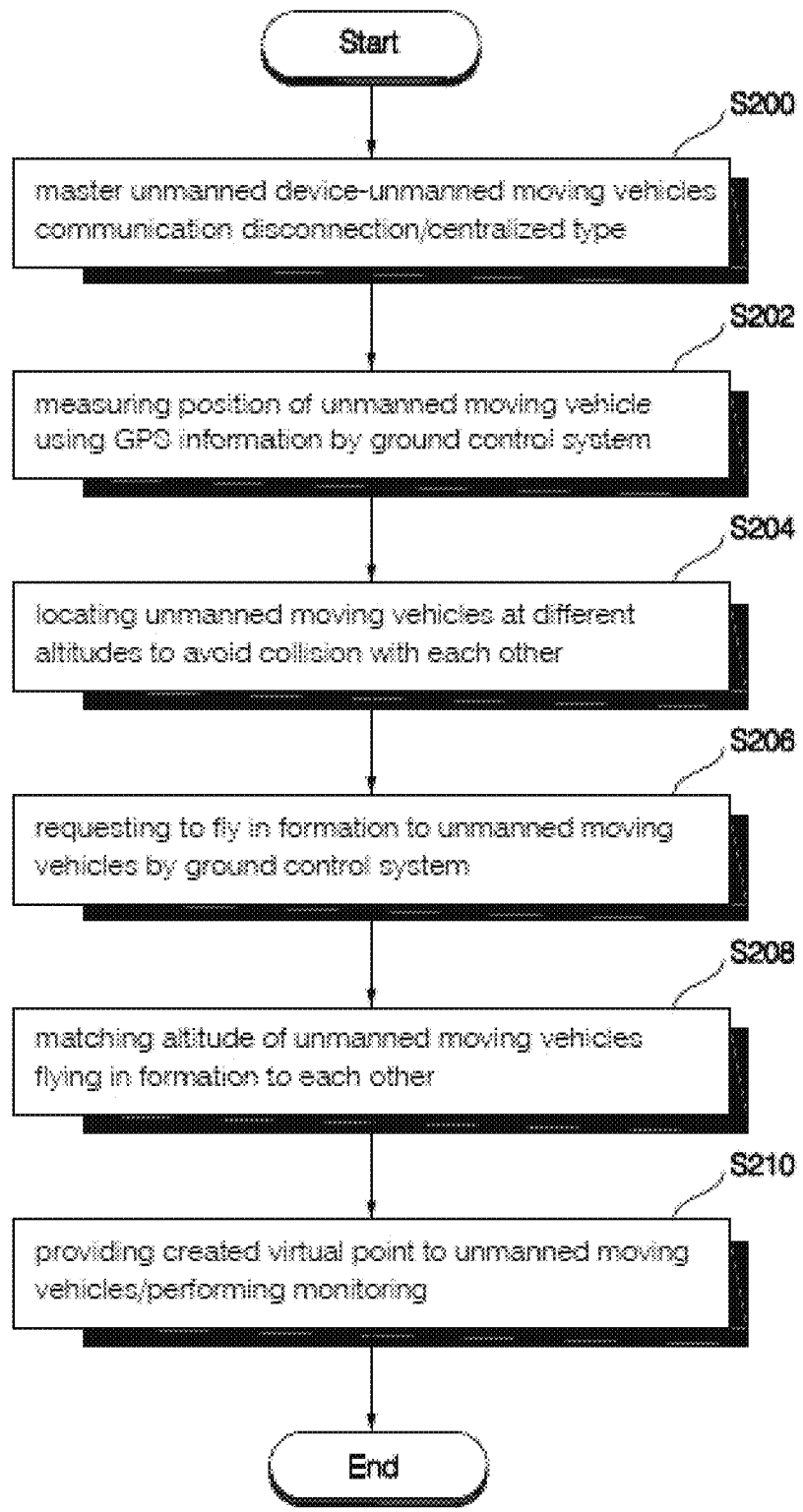
FIG. 2 is a view illustrating an operation that the unmanned moving vehicle performs when communication between a master unmanned device and unmanned moving vehicles is disconnected according to an embodiment of the present invention.

FIG. 2 is a view illustrating an operation that the unmanned moving vehicle performs when communication between a master unmanned device and unmanned moving vehicles is disconnected according to an embodiment of the present invention. Hereinafter, when communication between the master unmanned device and the unmanned moving vehicles is disconnected according to an embodiment of the present invention, an operation performed in the unmanned moving vehicle will be described in detail with reference to FIG. 2.

In step S200, when communication between the master unmanned device and the unmanned moving vehicles is disconnected, the unmanned moving vehicles share information with each other using Wi-Fi, and change from a decentralized type in which each unmanned moving vehicle individually calculates position commands and states, to a centralized type in which the ground control system controls the unmanned moving vehicles.

In step S202, the ground control system measures the position of each unmanned moving vehicle using GPS information provided from the unmanned moving vehicles.

In step S204, the unmanned moving vehicles move to an altitude that is set before control information is received from the ground control system. That is, the unmanned moving vehicles are located at different altitudes to avoid collision with each other.

In step S206, the ground control system requests unmanned moving vehicles to move to the calculated location of each unmanned moving vehicle and fly in formation, thereby performing environmental monitoring while avoiding collision with each other on the basis of the calculated location information. The unmanned moving vehicles maintain a certain distance while flying in formation.

In step S208, the unmanned moving vehicles flying in formation have an altitude matched to each other. In other words, when the unmanned moving vehicles receive a request to perform monitoring while flying in formation from the ground control system, the unmanned moving vehicles move to have the same altitude.

In step S210, the ground control system creates a virtual point in the center of the flight formation to replace the master unmanned device, calculates the position command in real time on the basis of the created virtual point, and controls the unmanned moving vehicles to perform monitoring in the calculated position.

As described above, according to the present invention, when the unmanned moving vehicles are disconnected from the master unmanned device, the unmanned moving vehicles move to have different altitudes from each other to avoid collision with each other, and move to have the same altitude to each other when receiving a request to fly in formation from the ground control system.

In addition, the present invention creates a virtual point instead of the master unmanned device located at the center of the flight formation and controls the movements of unmanned moving vehicles on the basis of the created virtual point. To this end, the ground control system creates the final position of the master unmanned device as the virtual point, or creates the virtual point using unmanned moving vehicle GPS information provided from the unmanned moving vehicles. The unmanned moving vehicles return to home when receiving a request to return from the ground control system.

According to the present invention, when communication between the unmanned moving vehicles and the master unmanned device is disconnected, flight formation is controlled to change from a decentralized-type control method to a centralized-type control method. According to the decentralized-type control method, each entity (unmanned moving vehicle) performs independent duties without a master transmitting control commands, whereas according to the centralized-type control method, the master generates and transmits all control commands and other entities perform their duties through the received commands.

According to an initial control method configured through Wi-Fi, although a master unmanned device is the center point of an unmanned moving vehicle formation, the master unmanned device simply transmits its own position, and position commands for each unmanned moving vehicle and the master unmanned device are calculated individually. Accordingly, when Wi-Fi is cut off due to bad weather, which is the most common at sea, the master unmanned device may return smoothly, but four unmanned moving vehicles flying in formation may undergo collision and falling-down during returning.

Therefore, the present invention proposes an algorithm to safely return to home and minimize loss due to fall. Herein, the algorithm is controlled in such a way to generate and transmit all position commands by not each unmanned moving vehicle, but the ground control system (centralized type).

Therefore, a role of the master unmanned device and a role of the ground control system acting in an emergency case are clearly different from each other. In other words, in a normal case, the master unmanned device performs control on movement of unmanned moving vehicles in order to minimize the load on the ground control system. Therefore, according to the present invention, a decentralized-type control method is selected in order to efficiently drive all processors as much as possible, and change to a centralized control method occurs only in the case of emergency. In addition, the ground control system using a relatively high-performance computer is set as the master in the case of emergency.

More specifically, in a normal case, the master unmanned device does not generate a command and shares only the location information with the unmanned moving vehicles, and the unmanned moving vehicles independently generate the command. On the contrary, in case of emergency, the ground control system generates command values and transmits the generated command values to the unmanned moving vehicles. Therefore, the role of the ground control system in the case of emergency is different from that of the master unmanned device in a normal case.

Figure 3:
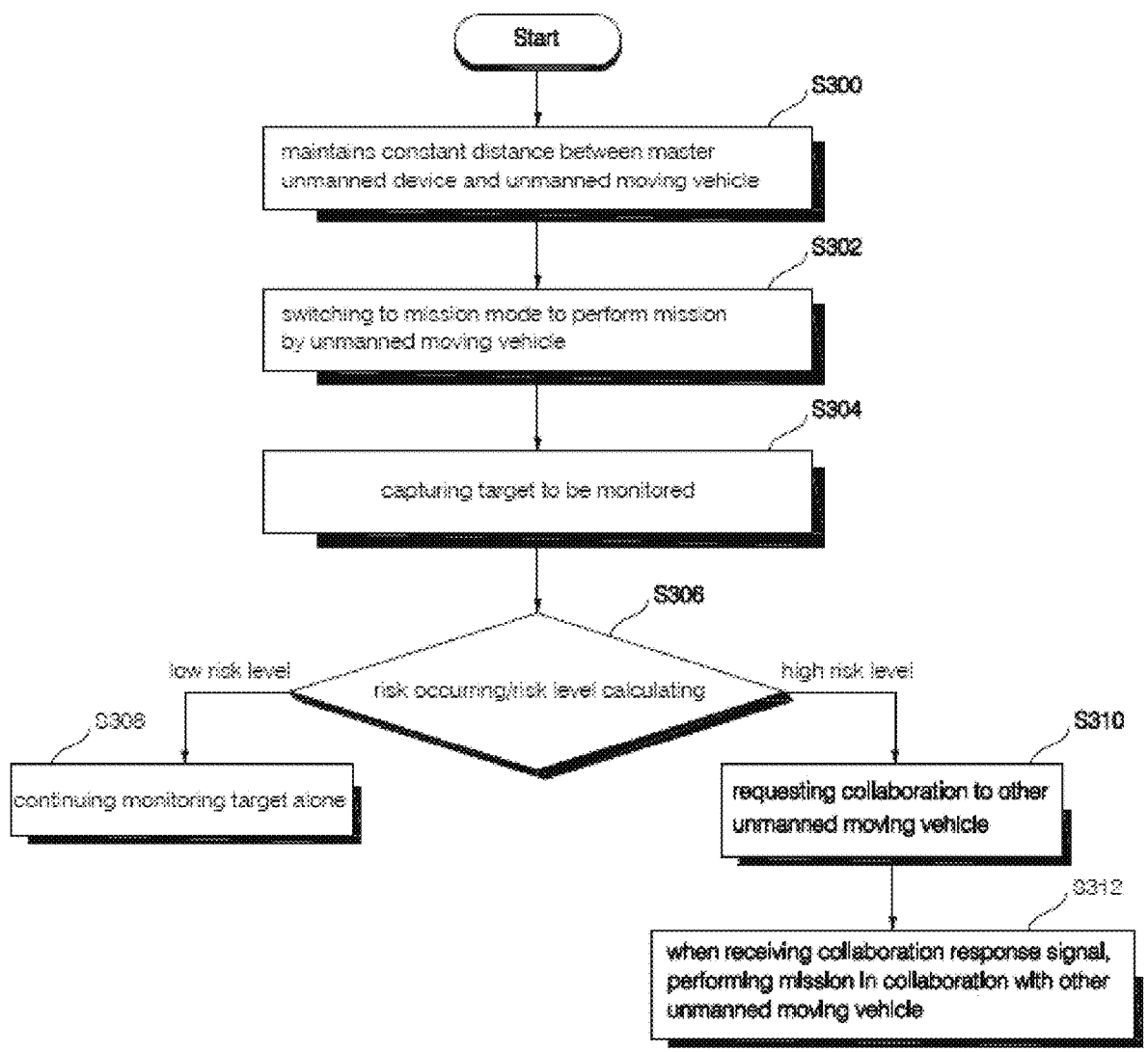
FIG. 3 is a flowchart illustrating an operation that an unmanned moving vehicle performs according to an embodiment of the present invention.

FIG. 3 is a flowchart illustrating an operation that an unmanned moving vehicle performs according to an embodiment of the present invention. Hereinafter, an operation performed by an unmanned moving vehicle according to an embodiment of the present invention will be described in detail with reference to FIG. 3.

In step S300, the unmanned moving vehicle follows the position of the master unmanned device and moves according to a movement of the master unmanned device. Specifically, the unmanned moving vehicle moves according to the movement of the master unmanned device in a state that maintains a constant distance from the master unmanned device.

In step S302, the unmanned moving vehicle switches to a mission mode to perform a mission.

In step S304, the unmanned moving vehicle determines whether a target to be monitored is detected. When the target is captured, the operation moves to the next step.

In step S306, the unmanned moving vehicle determines whether a risk occurs when monitoring the target. Whether the risk occurs is determined by determining whether the target is a floating object or a legal fishing boat (risk level 0), the target is a small illegal fishing boat (risk level 1), and the target is a large illegal fishing boat (risk level 2). To this end, the unmanned moving vehicle may receive information on the legal fishing boats from the ground control system or the master unmanned device.

In step S308, the unmanned moving vehicles continue to monitor the target when the target monitoring is at low risk. In other words, in the case of risk level 0 or risk level 1, the unmanned moving vehicle alone monitors the target.

In step S310, when the target monitoring is at high risk, the unmanned moving vehicles generate a signal to attempt a collaboration request and transmit the same to other unmanned moving vehicle.

In step S312, when the unmanned moving vehicles receive a collaboration response signal from the other unmanned moving vehicle, the unmanned moving vehicle performs the mission in collaboration with the other unmanned moving vehicle, whereas when the unmanned moving vehicle does not receive the collaboration response signal from the other unmanned moving vehicle, the unmanned moving vehicle performs the mission alone.

Of course, in the case that the unmanned moving vehicle receive a request for mission collaboration from other unmanned moving vehicle, when the unmanned moving vehicle is currently performing the mission, the unmanned moving vehicle completes the mission and then moves to the vicinity of the other unmanned moving vehicle, thereby performing the mission in collaboration. Of course, when the unmanned moving vehicle is not currently performing the mission, the unmanned moving vehicle moves near the other unmanned moving vehicle and performs the mission in collaboration. In other words, the unmanned moving vehicle currently performing its mission first completes the mission and then moves near the other unmanned moving vehicle, and then performs the mission requested from the other unmanned moving vehicle or returns to the base formation which is the original position.

Figure 4:
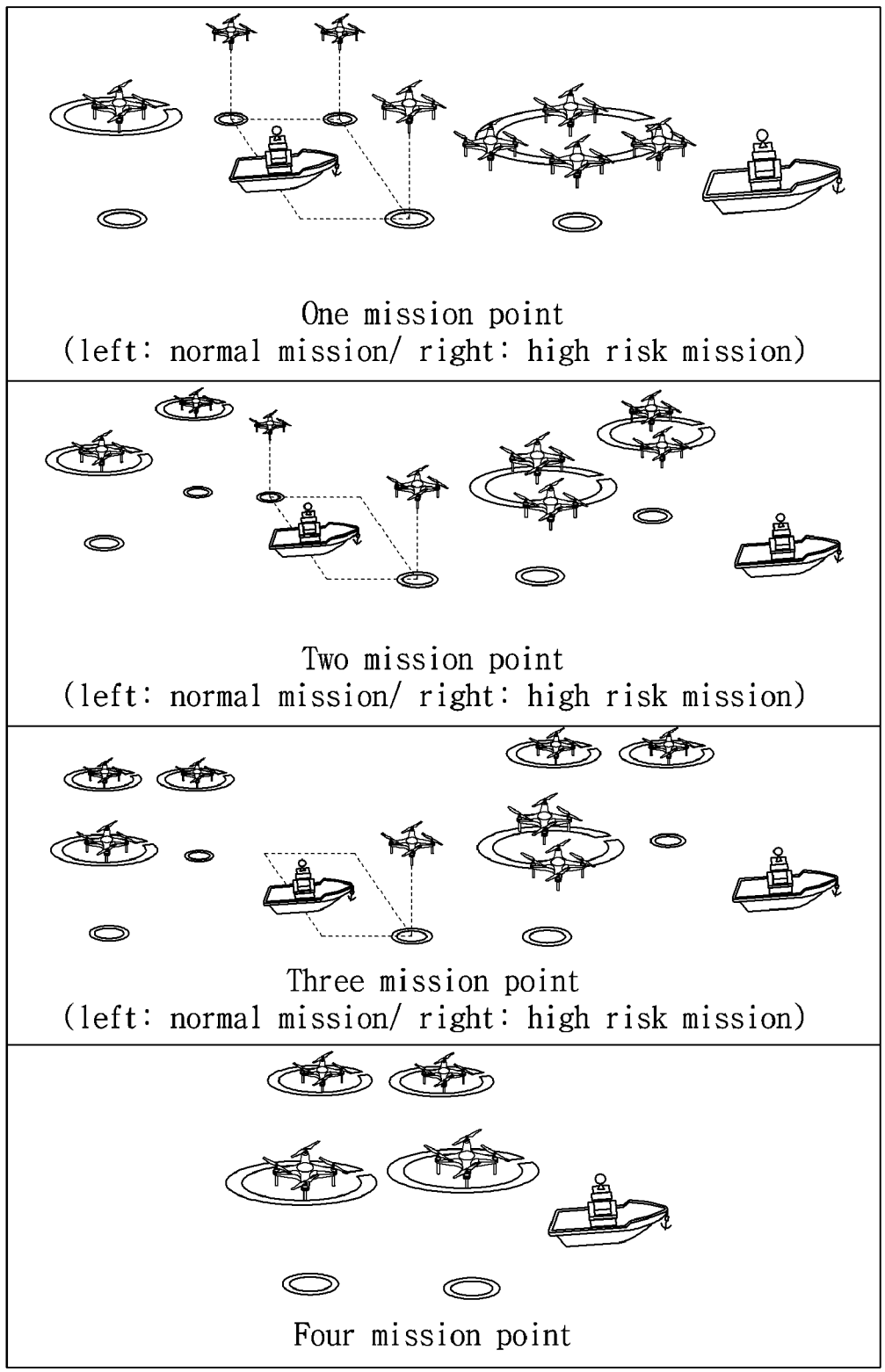
FIG. 4 is a diagram illustrating a process in which an unmanned moving vehicle performs a mission according to the number of mission points according to an embodiment of the present invention.

FIG. 4 is a diagram illustrating a process in which an unmanned moving vehicle performs a mission according to the number of mission points according to an embodiment of the present invention.

When there is only one mission point, one of the unmanned moving vehicles flying in formation performs the mission, and when there are two mission points, two unmanned moving vehicles of the unmanned moving vehicles flying in formation perform the mission. When there are three mission points, three unmanned moving vehicles of the unmanned moving vehicles flying in formation perform the mission, and when there are four mission points, all of the unmanned moving vehicles flying in formation perform the mission. Of course, when there is no mission point, the unmanned moving vehicles fly in formation on the basis of the master unmanned device, and when communication with the master unmanned device is disconnected, the unmanned moving vehicles fly in formation on the basis of a virtual point.

The present invention has been described with reference to one embodiment shown in the drawings, but this is merely exemplary, and those skilled in the art will understand that various modifications and other equivalent embodiments are possible therefrom.

What is claimed is:

1. An unmanned moving vehicle system for monitoring, the system comprising:
   a master unmanned device configured to perform communication with a ground control system located on a ground; and
   an unmanned moving vehicle configured to perform communication with the master unmanned device, fly in formation around the master unmanned device, and calculate a distance to other unmanned moving vehicle flying in formation when communication between the unmanned moving vehicle and the master unmanned device is disconnected,
   wherein the unmanned moving vehicle is further configured to extract a bounding box surrounding an object photographed through a camera, and use a height, horizontal width, and diagonal length of the extracted bounding box, an average height, an average width, and an average length, a height error between an actual height and an estimated height, a width error between an actual width and an estimated width, and a length error between an actual length and an estimated length, and a compensation value of each of the height error, the width error and the length error, in order to calculate the distance to the other unmanned moving vehicle, the diagonal length is a length between a rear left lower corner and a front right upper corner of the bounding box, wherein the unmanned moving vehicle is further configured to accumulate the compensation value by performing repeated machine learnings, wherein the unmanned moving vehicle is further configured to increase the accumulated compensation value to a positive value as error values are decreased by performing the repeated machine learnings, wherein the unmanned moving vehicle is further configured to calculate the distance by the repeated machine learnings reducing the height error, the width error and the length error through at least one vector which includes the height of the bounding box, the horizontal width of the bounding box, and the diagonal length of the bounding box, the average height, the average width, and the average length, the height error, the width error, and the length error and the compensation value, and wherein, in a state in which the communication between the unmanned moving vehicle and the master unmanned device is disconnected, the unmanned moving vehicle is further configured in such a manner as to move to have an altitude different from the other unmanned moving vehicle until receiving a request to fly in formation with the other unmanned moving vehicle from the ground control system.

2. The system of claim 1, wherein the unmanned moving vehicle is further configured in such a manner as to maintain a same altitude as the other unmanned moving vehicle in a state in which the communication between the unmanned moving vehicle and the master unmanned device is connected.

3. The system of claim 2, wherein the unmanned moving vehicle is further configured to receive a request to fly in formation with the other unmanned moving vehicle from the ground control system, and the unmanned moving vehicle is further configured to fly in formation with the other unmanned moving vehicle on the basis of a virtual point provided from the ground control system.

4. The system of claim 1, wherein the actual height, the actual width and the actual length are values input to the unmanned moving vehicle together with a photograph of the object, and the estimated height, the estimated width and the estimated length are values calculated from an image of the object photographed through the camera.

5. The system of claim 1, wherein the unmanned moving vehicle is further configured to calculate the compensation value of the error in such a manner that the compensation value of the error is increased by 1 when the error is within a predetermined value, and the compensation value of the error is decreased by 1 when the error exceeds the predetermined value.

6. The system of claim 1, wherein the unmanned moving vehicle is further configured to reject a request for collaboration, and the request is transmitted from the other unmanned moving vehicle, when the unmanned moving vehicle is currently monitoring a target.

7. The system of claim 1, wherein the unmanned moving vehicle is further configured to make a request for collaboration to the other unmanned moving vehicle, depending on a risk level of the target being monitored, and the unmanned moving vehicle is further configured to determine the risk level for the target according to at least two factors, and the at least two factors include whether the target is a floating object and a size of the target.

8. The system of claim 1, wherein:
the average height, the average width and the average length are average values of a plurality of objects; and
the unmanned moving vehicle is further configured to store the average values, and identify the object by using the average values.

9. The system of claim 1, wherein the unmanned moving vehicle is further configured to set the at least one vector as an input layer, perform the machine learning through hidden layers, and identify the object through a corresponding hidden layer.

* * * * *